Dec. 15, 1942.  W. G. TENNEY  2,305,503
BATTERY TERMINAL
Filed April 22, 1942
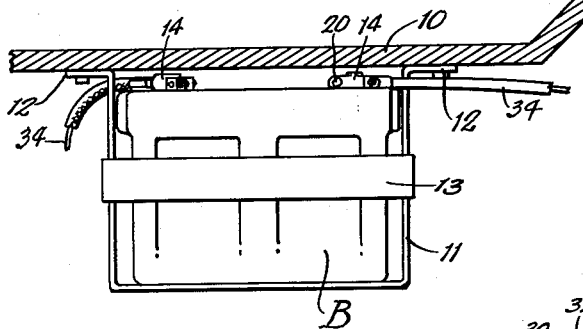
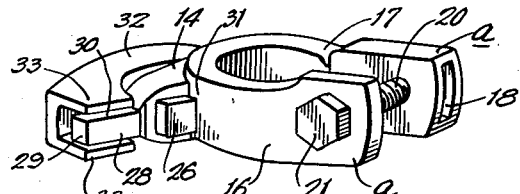
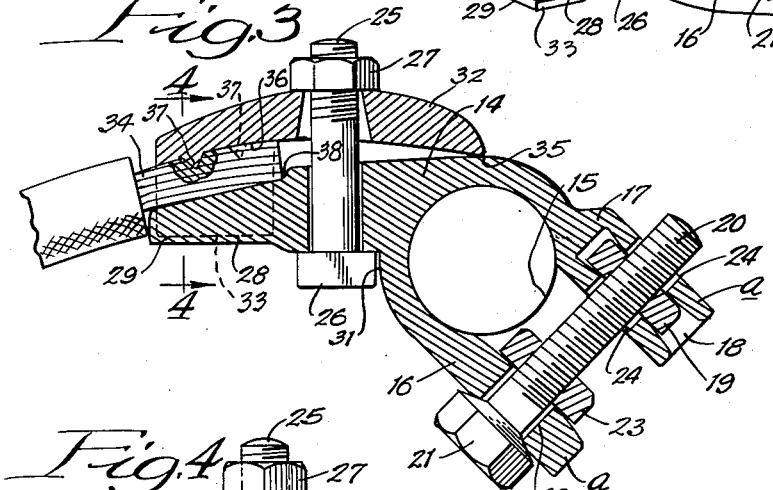
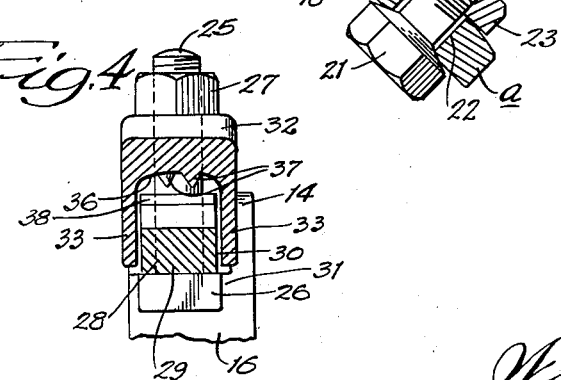
Inventor:
William G. Tenney,
By Dunning & Dunning
Attorneys.

Patented Dec. 15, 1942

2,305,503

UNITED STATES PATENT OFFICE 2,305,503

BATTERY TERMINAL

William G. Tenney, Chicago, Ill.

Application April 22, 1942, Serial No. 439,973

3 Claims. (Cl. 173—259)

This invention relates to a battery terminal, and has for its object the provision of connections which may be easily operated within a limited space, and avoidance of interference from obstructions caused by corrosion or binding. More particularly the present improvements are concerned with the means for engaging with and clamping upon one end portion of a cable leading to or from the battery, a partial disclosure whereof is contained in my application filed April 14, 1941, Serial No. 388,472, issued as Patent 2,287,490 on June 23, 1942, of which this case is a continuation in part.

More detailed objects will appear in the following description and in the drawing, wherein:

Figure 1 is a cross-sectional view showing my terminal applied to a conventional battery in place under the floor board of a car;

Fig. 2 is a perspective view of the terminal;

Fig. 3 is a longitudinal horizontal section taken one line 3—3 of Figure 4, showing the terminal applied to a battery post; and Figure 4 is a transverse sectional view taken on line 4—4 of Figure 3.

Figure 1 shows a battery B, which may be of the type conventionally used in automobiles, mounted below a floor board 10 in a box formed by a depending bracket 11 secured at its ends 12 to the under side of the floor board by any customary means, not shown. Side straps 13 may connect with the bracket to secure the battery against lateral displacement in the box. The space between the battery top and the under side of the floor board is usually very close, and the present terminal is peculiarly adapted to be used in such an environment. To effectuate this improvement I have made the movable parts of my terminal, which comprises a body having a battery post attaching portion and a cable attaching portion, operable in a plane adjacent and parallel to the battery top.

The body 14 of my terminal is formed preferably of a yieldable material such as bronze or the like, and from it extends a pair of integral arms 16 and 17, with confronting sides formed to fit about one of the posts 15 of the battery. At the end of each of the arms is a head $a$, the one on the arm 17 being sufficiently thick to accommodate a slot or chamber 18 in which is housed a nut 19. The chamber 18 is open at the end of the arm remote from the body to permit easy insertion or removal of the nut.

The arms 16 and 17 are adapted to be clamped around the post 15 with the aid of a bolt 20 which is extended therebetween and there-through. The bolt which is provided at one end with a head 21 passes through an opening 22 in the arm 16, and carries a thrust collar 23 which may be screwed upon the bolt which also extends through a pair of registering openings 24 in the arm 17, one traversing each of the walls on opposite sides of the chamber 18 and through the nut 19 therein.

As here shown, I have threaded the bolt 20 from its end to a point just short of the arm 16. In this manner I determine the spacing of the thrust collar from the bolt head, screwing the collar tightly at the end of the threading. When it is desired to remove the terminal from the post, a reverse movement of the bolt will cause the collar 23 to exert an outward thrust against the inner face of the arm 16, and the nut 19 to exert an opposite thrust against the arm 17, so that the two arms are forcibly spread. This forces a loosening of the terminal from the post, and from the corrosive material that may have accumulated about the post.

The present improvements are concerned with a cable attaching portion which is disposed in the same plane as the post attaching portion for releasably securing the cable without the necessity of removing the terminal from the battery. This has the advantage of spacing the cable connecting means at a point remote from the post, and makes the connecting or disconnecting of the cable a simple operation.

The cable attaching portion of the terminal comprises a pair of jaws joined through registering openings in each by a connecting bolt 25 with a head 26 at one end and a nut 27 near the other end. One jaw 28 which is fixed extends from one end of the terminal body 14 in the form of an elongated tongue 29 having at least one of its sides 30 inset to lie in a plane inwardly of the proximate parallel face of the terminal body. The fixed jaw is shown as extending angularly from the terminal body whereby to form therewith a shoulder 31 adjacent the bolt head 26 to prevent rotation thereof. The movable jaw 32 is provided with a pair of spaced cheeks 33 adapted to overlap the inset tongue 29 of the fixed jaw when the two jaws are tightened over a cable 34 inserted therebetween. With such a construction at least one of the cheeks is accommodated within a plane that does not protrude beyond the proximate parallel face of the terminal body.

The movable jaw 32 is here shown as formed of a separate piece of material bowed slightly outwardly from end to end. This jaw operates as a lever of the third class, the acting force, the bolt 25, being between the resisting force, the cable 34, and the fulcrum 35, where the movable jaw rests on the fixed jaw. This permits the movable jaw 32 to rock upon the other, thus assuring a better clamping engagement on the cable.

The engaging face 36 of the movable jaw which is dome shaped, is concave transversely as shown in Fig. 4, thereby better to accommodate the cable. As shown in Fig. 3, this engaging face cooperates with the tongue of the fixed jaw 28, and to better secure the cable in place therebetween misaligned teats 37 may also protrude from one of these parts to enhance its gripping effect upon the cable. At the rear of the cavity between the jaws is a transverse stop 38, here shown as part of the fixed jaw, to serve as an abutment for the cable end which is clamped between the jaws.

The advantages of my construction are several, as has already been pointed out. Due to its special construction, and to its operability in a narrow space, the terminal is adapted to fit into and be used with facility under conditions which ordinarily make accessibility and operation difficult.

I claim:

1. A battery terminal in which is a body provided with horizontally disposed battery terminal engaging jaws and adjustable connecting means therefor and having a cable attaching portion, comprising a pair of opposed horizontally arranged jaws, one movable and the other fixed, there being a pair of registering openings in the two jaws, a threaded bolt extended through the openings, a head at one end of the bolt in engagement with one jaw, a nut adjustably fitted upon the bolt adapted to engage the other jaw, one of the jaws being integral with the terminal body and formed at its end remote therefrom with a longitudinally projecting tongue located in the same horizontal plane as said battery terminal engaging jaws and narrowed in a direction which parallels the bolt axis, the movable jaw being outwardly longitudinally bowed and adapted for movement in a horizontal direction toward and from the fixed jaw and adapted to rest at one end upon the fixed jaw at a point between the registering openings and the post attaching portion of the terminal, the movable jaw comprising a pair of spaced cheeks adapted to overlap the tongue of the fixed jaw, the face of the movable jaw between the spaced cheeks being adapted to coact with the confronting face of the tongue to grip therebetween the end portion of a cable.

2. A battery terminal comprising a body with opposite parallel faces having a battery post attaching portion and a cable attaching portion, the cable attaching portion comprising a pair of opposed jaws formed with openings in register, a bolt passed through the openings adapted to impel movement of the jaws toward each other and to secure the jaws in desired positions, a pair of spaced cheeks on one jaw adapted to receive the other jaw, one of the jaws being fixed in relation to the terminal body, the other jaw being bowed outwardly longitudinally of itself and adapted to rest at one end on the fixed jaw, the two coacting jaws, one movable and the other fixed, forming a cable-securing clamp, the outer faces of at least one of the spaced cheeks being disposed within the plane defined by the parallel proximate face of the terminal body, and said battery post attaching portion comprising relatively movable jaws for engaging the battery posts and adjustable connecting means therefor, the jaws of the battery post attaching portion and the cable attaching portion being all disposed in the same horizontal plane and relatively movable toward and from each other in a horizontal direction whereby the battery terminal is adapted for operation in the limited space between a battery and the floor board of a car.

3. A battery terminal comprising a body with opposite parallel faces having a battery post attaching portion and a cable attaching portion, the cable attaching portion comprising a pair of opposed jaws, one movable and the other fixed, there being a pair of registering openings in the two jaws, a threaded bolt extended through the openings, a head at one end of the bolt in engagement with one jaw, a nut adjustably fitted upon the bolt adapted to engage the other jaw, the fixed jaw being integral with the terminal body and formed at its end remote therefrom with a tongue narrowed in a plane which parallels the axis of the bolt, a shoulder formed crosswise of the tongue, the movable jaw being outwardly longitudinally bowed and adapted for movement toward and from the fixed jaw and adapted to rest at one end upon the fixed jaw at a point between the registering openings and the post attaching portion of the terminal, the movable jaw comprising a pair of spaced cheeks adapted to overlap the tongue of the fixed jaw, the face of the movable jaw between the spaced cheeks being formed with protruding elements adapted to grip the end portion of a cable placed therein, the outer faces of at least one of the spaced cheeks being disposed within the plane defined by the parallel proximate face of the terminal body, and said battery post attaching portion comprising relatively movable jaws for engaging the battery posts and adjustable connecting means therefor, the jaws of the battery post attaching portion and the cable attaching portion being all disposed in the same horizontal plane and relatively movable toward and from each other in a horizontal direction whereby the battery terminal is adapted for operation in the limited space between a battery and the floor board of a car.

WILLIAM G. TENNEY.